United States Patent [19]

Parfondry

[11] Patent Number: 4,906,720

[45] Date of Patent: Mar. 6, 1990

[54] POLYISOCYANATE PREPOLYMER COMPOSITIONS AND THE USE THEREOF IN THE PREPARATION OF POLYURETHANES

[75] Inventor: Alain Parfondry, Evere, Belgium

[73] Assignee: Imperial Chemical Industries, London, England

[21] Appl. No.: 260,313

[22] Filed: Oct. 20, 1988

[30] Foreign Application Priority Data

Oct. 28, 1987 [GB] United Kingdom ................. 8725217

[51] Int. Cl.$^4$ .............................................. C08G 18/10
[52] U.S. Cl. ........................................ 528/28; 528/68; 528/75; 528/76; 528/77; 528/81; 528/83; 528/84
[58] Field of Search ....................... 528/76, 83, 84, 81, 528/68, 75, 77, 28

[56] References Cited

U.S. PATENT DOCUMENTS 4,376,834 3/1983 Goldwasser et al. ................. 528/81

*Primary Examiner*—Maurice J. Welsh
*Assistant Examiner*—Rabon Sergent
*Attorney, Agent, or Firm*—Cushman, Darby & Cushman

[57] ABSTRACT

A polyisocyanate prepolymer composition comprising the reaction product of
(a) an organic polyisocyanate or polyisocyanate mixture
(b) a high molecular weight isocyanate-reactive compound or mixture thereof having a molecular weight from about 1,000 to 10,000
(c) a low molecular weight isocyanate-reactive compound or mixture thereof having a molecular weight of about 60 to below 1,000 wherein the weight ratio of low to high molecular weight compounds is in the range 40–1,000.

11 Claims, No Drawings

POLYISOCYANATE PREPOLYMER COMPOSITIONS AND THE USE THEREOF IN THE PREPARATION OF POLYURETHANES

This invention relates to new isocyanate prepolymer compositions as well as to their use in the production of polyurethane or polyurea-polyurethane or polyurea articles. In particular, the invention relates to isocyanate prepolymer compositions, which are useful in the manufacture of integral skin foams, flexible foams, RIM elastomers, micro-cellular elastomers and the like.

It is well known to manufacture polyurethanes, of a cellular or non-cellular nature, by reacting an organic polyisocyanate with an organic polyol in the presence of additives of various kinds. Many organic polyisocyanates have been proposed for use in making polyurethanes but, since many polyurethane manufacturing processes involve the rapid mixing of materials at room temperature, it is preferred to use polyisocyanates that are liquid at room temperature and that remain in the liquid state without significant deposition of solid materials even when stored at relatively low temperatures such as may be encountered in winter.

Furthermore the liquidity is of particular importance in the RIM technology where the reactants are mixed by impingement under high pressure and injected into the mould: the rate of injection and mixing being strongly dependent on the viscosity of the reactants.

Examples of liquid isocyanate compositions used in polyurethanes manufacture include isocyanate prepolymers obtained by reacting polyisocyanates with one or more isocyanate-reactive compounds.

Prepolymers which are formed by reacting polyisocyanates with high and low Mw isocyanate-reactive compounds, are disclosed in U.S. Pat. No. 4,532,316. These are opaque solids at room temperature and only processable upon heating. They are curable by conventional procedures to thermoset polyurethane elastomers or higher melting thermoplastic polyurethanes.

Stable liquid isocyanate prepolymers which are based on low and high Mw isocyanate-reactive compounds are disclosed in U.S. Pat. No. 4,321,333.

DE 3 516 730 also discloses stable liquid MDI prepolymers based on a large excess of high Mw isocyanate-reactive compounds as compared with the amounts of low Mw compounds.

These known stable liquid isocyanate prepolymers however involve in practice serious processability problems due to their relatively high viscosity.

It has now been found surprisingly that stable, relatively low viscosity liquid polyisocyanate prepolymer compositions can be obtained by reacting organic polyisocyanates with low amounts of high Mw isocyanate-reactive compounds and an excess with respect to the high Mw isocyanate-reactive compounds of low Mw isocyanate-reactive compounds.

These liquid compositions show improved processability associated with higher stability at 0° C. and reduced viscosity.

It is further the purpose of the invention to provide a method to produce polyurethane or polyurea-polyurethane products with good physical properties associated with a short demould time.

Thus according to this invention, there is provided a polyisocyanate prepolymer composition comprising the reaction product of:

(a) an organic polyisocyanate or isocyanate mixture comprising at least 50 mole % of diisocyanate, and optionally carbodiimide or uretonimine modified isocyanate groups, and having an isocyanate functionality of about 2 to 4.

(b) a high molecular weight isocyanate-reactive compound or mixture thereof having a molecular weight from above 1,000 to 10,000 and a number average functionality of 1.8–5.0.

(c) a low molecular weight isocyanate reactive compound or mixture thereof, having a molecular weight from about 60 to below 1,000 and a number average functionality of 1.8–5.0, wherein the weight ratio of low to high Mw compounds is at least 6.

Preferred are weight ratios between 7:1 and 20:1.

The organic isocyanate employed in the manufacture of the prepolymers of the present invention will have a number averaged functionality between 2 and 4, more preferably between 2 and 3, and most preferably between 2.0 and 2.5. The isocyanates will have equivalent weights of between 70 and 1,000, more preferably between 85 and 500, and most preferably between 87 and 350. Mixtures of isocyanates may be used, in which case the equivalent weights and functionalities are understood to be number averaged equivalent weights and isocyanate functionalities for the mixture.

At least 50, more preferably 70, and most preferably 90 or more mole percent of the isocyanate-containing molecules in the mixture (or starting "isocyanate") are diisocyanates.

It is desirable that at least 51 mole percent, more preferably 70, and most preferably 90 mole percent or greater percent of the isocyanate groups are bonded directly to aromatic carbon atoms.

Organic polyisocyanates which may be used in the preparation of the polyisocyanate compositions of the invention include aliphatic, cycloaliphatic and araliphatic polyisocyanates, for example hexamethylene diisocyanate, isophorone diisocyanate, cyclohexane-1,4-diisocyanate, dicyclo- hexylmethane-4,4-diisocyanate and p-xylylene diisocyanate. The preferred polyisocyanates, however, are the aromatic polyisocyanates, for example phenylene diisocyanates, tolylene diisocyanates, 1,5-naphtylene diisocyanate, polyphenyl polymethylene polyisocyanates and especially the available MDI isomers, that is to say 4,4'-diphenylmethane diisocyanate, 2,4'-diphenylmethane diisocyanate and mixtures thereof.

Preferred isocyanates include 2,4' and 4,4'-diphenylmethane diisocyanate ("pure" MDI) or mixtures of methyldiphenyl isocyanates containing substantial amounts of the stated diisocyanates.

The isocyanate may further include a uretonimine modified polyisocyanate variant which may be produced according to known art.

Mixtures of two or more different isocyanates may be employed. Especially preferred is a mixture comprising a uretonimine modified diisocyanate variant and a nonvariant polyisocyanate, such as pure and/or crude MDI.

The high Mw polyfunctional isocyanate reactive compounds used to prepare the isocyanate prepolymers of this invention have a Mw of about 1,000 to 10,000, preferably of about 1,000 to 7,000.

Their number average functionality ranges from 1.8 to 5, preferably from 2 to 3.

Typical high Mw isocyanate-reactive compounds include polyols, polyamines, imino-functional compounds, enamine-containing compounds and mixtures thereof.

Suitable polyols and methods for their preparation have bee fully described in the prior art and, as examples of such polyols, there may be mentioned polyesters, polyesteramides, polythioethers, polycarbonates, polyacetals, polyolefins, polysiloxanes and, especially, polyethers.

Polyether polyols which may be used include polyoxyalkylene polyether polyols obtained by the polymerisation of a cyclic oxide, for example ethylene oxide, propylene oxide or tetrahydrofuran in the presence, where necessary, of polyfunctional initiators. Suitable initiator compounds contain a plurality of active hydrogen atoms and include water and polyols, for example ethylene glycol, propylene glycol and their oligomers, cyclohexane dimethanol, resorcinol, bisphenol A, glycerol, trimethylolpropane, 1,2,6-hexanetriol or pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Mixtures of the said diols and triols can be particularly useful. Other useful polyether polyols include polytetramethylene glycols obtained by the polymerisation of tetrahydrofuran.

Polyester polyols which may be used include hydroxyl-terminated reaction products of polyhydric alcohols such as ethylene glycol, propylene glycol, diethylene glycol, 1,4-butanediol, bis(hydroxyethyl)terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride or its derivatives such a tetrabromophthalic anhydride or dimethyl terephthalate or mixtures thereof.

Polyesteramides may be obtained by the inclusion of aminoalcohols such as ethanolamine in polyesterification mixtures. Polyesters obtained by the polymerisation of lactones, for example caprolactone, in conjunction with a polyol, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and suitable polysiloxane polyols include polydimethylsiloxane diols and triols.

Polyamines having molecular weights of at least 1000 include amino-terminated polythioethers, polyesters, polyesteramides, polycarbonates, polyacetals, polyolefins, polysiloxanes and especially, polyethers. Polyether polyamines which may be used include products obtained by the reductive amination of polyether polyols as described, for example, in U.S. Pat. No. 3,654,370, or by the cyanoethylation of polyols followed by hydrogenation. Polyoxypropylene and poly(oxyethylene-oxypropylene)diamines and triamines and mixtures thereof are preferred.

Imino-functional compounds which may be used are imino-functional compounds capable of reacting directly with polyisocyanates without prior cleavage of the C=N bond to form a monomeric byproduct. Suitable imino-functional compounds include imino-functional polyether resins having molecular weights of at least 1000, preferable 2000 to 8000 and a number average imino-functionality from about 2 to about 4.

"Imino-functional" as used herein means that a reactant contains the grouping:

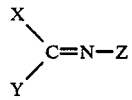

wherein X, Y and Z are chemical moieties which collectively form the rest of said compound and are each independently selected from hydrogen and organic radicals which are attached to the imino unit:

said compound through N, C, O, S, Si or P, the central carbon atom of said imino unit being bonded to three atoms.

In the above structure, neither the carbon nor the nitrogen atom of the imino unit should be incorporated within an aromatic or other fully conjugated ring or ring system. It is preferred that Z is attached to the imino unit through saturated atoms, preferably aliphatic carbon atoms.

The range of imino-functional reagents which may be used in the invention is not limited by or to any particular chemistry of the preparation of said reagents. For example, imine terminated aliphatic polyethers may be made by a number of different routes. Specifically, the amine groups (—NH$_2$) of an aliphatic amine-terminated polyether can be prereacted with an aldehyde (XCH$_2$CHO) or a ketone (X—CO—Y), to form, respectively, the corresponding aldimine

or the corresponding ketimine-terminated polyethers:

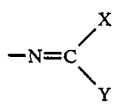

or the aldehyde and/or ketone group of an aldehyde and/or ketone-terminated polyether, can be prereacted with an aliphatic primary mono-amine to form, respectively, the corresponding aldimine and/or ketimine-terminated polyethers:

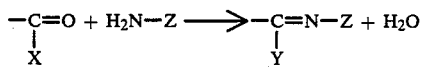

The preparation of imino functional groups in both cyclic and acyclic forms is well known in the literature, such as from "The Chemistry of the Carbon-Nitrogen Double Bond", Ed. S. Patai, Interscience Publishers, London, 1970 and references therein.

Enamine-containing compounds which may be present include compounds having the structures:

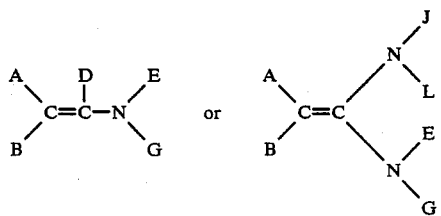

wherein each of A, B, D, E, G, J and L, independently, represents hydrogen or, preferably, an optionally substituted hydrocarbon radical, any of A, B and D and, independently, any of E, G, J and L optionally being joined together to form one or more carbocyclic or heterocyclic rings.

In many preferred enamine-functional compounds E, G, J and L ar not hydrogen. It is also preferred that not both of A and B are hydrogen. Especially useful enamino-functional compounds contain two or more enamine groups as a result of any of A, B, D, E, G, J and/or L being a radical terminating in one or more enamino groups.

Preferred enamine-functional compounds include enamino-functional polyether resins having molecular weights of at least 1000, preferably 2000 to 8000 and a number average enamine functionality from about 2 to about 4.

Suitable enamino-functional compounds may be obtained in known manner by reacting a carbonyl compound containing at least one alpha-hydrogen atom, for example an aliphatic, cyclo-aliphatic or araliphatic aldehyde or ketone such as acetaldehyde, propionaldehyde, isobutyraldehyde, caproaldehyde, cyclohexylaldehyde, acetone, methyl ethyl ketone, benzyl methyl ketone, cyclopentanone, cyclohexanone, trimethylcyclohexanone, mixtures of these and the like with a secondary amine, for example a secondary amino-terminated polymer such as a polyether.

General techniques for the synthesis of enamines have been described in, for example, Org. Coatings and Plastics Chem., 44, 151 and 157, (1981), 456 and 461, and U.S. Pat. Nos. 4,342,841 and 4,552,945.

The low Mw isocyanate reactive compounds used to prepare the composition of the present invention have a Mw of about 60 to 1,000, preferably of about 60 to 450 and most preferably of about 100 to 200. They have an average functionality of 1.8 to 5. Preferably the functionality ranges from 1.95 to 2.20.

Suitable compounds may be selected from the following classes:
(a) hydroxy compounds
(b) amino compounds
(c) hydroxyamino compounds
(d) imino-functional and/or enamine-containing compounds or mixtures thereof Polyols having molecular weights below 1000 include simple non-polymeric diols such as ethylene glycol, propylene glycol, dipropylene glycol, tripropylene glycol and 1,4-butanediol.

Polyamines having molecular weights below 1,000 which may be used include aliphatic, cycloaliphatic or araliphatic polyamines containing two or more primary and/or secondary amino groups and, especially, aromatic polyamines.

Aromatic polyamines which are useful in the invention particularly include diamines, especially those having molecular weights from about 100 to about 400, preferably between 122 and 300. Suitable diamines have been fully described in the prior art and include 3,5-diethyl-2,4-toluenediamine, 3,5-diethyl-2,6-toluenediamine, DETDA which is a mixture of about 80% by weight of 3,5-diethyl-2,4-toluenediamine and about 20% by weight of 3,5-diethyl-2,6-toluenediamine, 1,3,5-triethyl-2,6-diaminobenzene, 2,4-diaminotoluene, 2,6-diaminotoluene, 2,4'-diaminophenylmethane, 4,4'-diaminodiphenylmethane, 3,3',5,5'-tetraisopropyl-4,4'-diaminodiphenylmethane and the like and mixtures thereof.

Suitable alkanolamines comprise monoethanolamine, diethanolamine, isopropanolamine and the like.

Suitable low Mw imino-functional and/or enamine-containing compounds have the characteristics of the higher molecular weight imino-functional or enamine-containing compounds described above, except that they have a molecular weight below 1,000.

Examples of preferred low Mw imino-functional compounds include simple aldimines and/or ketimines such as may be obtained by reacting aldehydes, for example formaldehyde, acetaldehyde, salicylaldehyde, propionaldehyde, n-butyraldehyde, isobutyraldehyde, heptaldehyde, alpha-methylvaleraldehyde, beta-methylvaleraldehyde, caproaldehyde, isocaproaldehyde or cyclohexyl aldehyde and mixtures thereof or ketones, for example acetone, methyl ethyl ketone, diethyl ketone, benzyl methyl ketone or cyclo-hexanone and mixtures thereof with primary amines, especially aliphatic diamines. Examples of suitable amines include hexamethylene diamine, menthane diamine, isophorone diamine, xylylene diamine, 2-methylpentamethylene diamine, polyoxyalkylene diamines and/or triamines and mixtures of such amines. Primary mono-amines may also be used either alone or together with diamines.

Examples of suitable enamine-containing compounds are described in U.S. Pat. Nos. 4,342,841 and 4,552,945. Other examples include the bis-enamines formed by reacting piperazine with simple carbonyl compounds such as acetone, methyl ethyl ketone cyclohexanone and the like.

Generally, the amounts of isocyanate, high Mw and low Mw isocyanate-reactive compounds are selected in such a way that the final isocyanate content of the prepolymer compositions is in the range of 5% to 30% wt, preferably 15% to 26% wt, and most preferably of 14% to 26% by wt.

Formation of the instant prepolymers involves reacting the organic isocyanate with the isocyanate reactive compounds, preferably at a temperature between 70° and 90° C.

The optimum conditions for the formation of prepolymers involve slow addition of the isocyanate reactive material to the isocyanate with agitation. The addition rate should be such as to avoid an uncontrolled exothermic reaction, and the duration of the reaction should be as necessary to obtain essentially complete transformation of the isocyanate reactive groups into urethane or urea bonds.

It is preferred to pre-mix the low Mw and high Mw isocyanate-reactive compounds to be used, into a blend of the desired composition, and to add the blend to the isocyanate under the desired set of conditions in order to prepare the prepolymer composition intended. In this way, all of the chemical reactions involved are completed in a single step. It is possible, however, to form the prepolymer composition in several separate steps. The reaction is performed in an appropriate apparatus, by heating the mixture under an inert atmosphere at a temperature within the range of about 50° C. to about 150° C. until the reaction is completed, as determined, for example, by titrimetric determination of the free concentration of isocyanate groups in the prepolymer composition.

In a preferred embodiment of this invention, polymeric MDI and/or liquified uretonimine modified MDI are added to the polyisocyanate composition in such proportions that the final content of polymeric MDI and/or uretonimine modified MDI should be up to about 50% by weight of total blend, and even of up to 95% by weight of the total blend. These blends have been shown to be storage stable for prolonged periods at 0° C.

The polyisocyanate compositions, which are the object of the present invention, generally show a viscosity of less than 8,000 cps (at 25° C.), preferably less than 3,000 cps, most preferably in a range of about 300 cps to 3,000 cps.

The polyisocyanate compositions of the present invention are useful in the manufacture of polyurethane, polyurea-polyurethane or polyurea products upon reaction with isocyanate-reactive materials.

By suitable choice of ingredients, concentrations and processing conditions as will be readily understood by the skilled art worker, the present polyisocyanate compositions, or their blends, can be used in the production of RIM elastomers, microcellular elastomers, integral skin foams or flexible foams.

Thus, in a further aspect of the invention, there is provided a reaction system for use in the manufacture of such products, said system comprising the following components:

(A) a polyisocyanate composition or blend in accordance with the invention (B) an isocyanate-reactive component which comprises:
 (i) at least one high Mw isocyanate reactive compound of Mw at least 1,000
 (ii) at least one low Mw isocyanate reactive compound of Mw up to 1,000
 (iii) optionally at least one blowing agent
 (iv) optionally other additives Component B of the reaction system of the invention, the isocyanate-reactive component, may contain the usual ingredients of such components, for example soft block components, chain extenders and mixtures thereof. Typical soft block components include polyols, polyamines, imino-functional compounds, enamine-containing compounds and mixtures thereof having molecular weights of at least 1,000 whilst typical chain extenders include compounds of the same classes having molecular weights below 1,000.

Suitable soft block and low molecular weight components include those components which have been already disclosed above in relation to the preparation of the polyisocyanate composition.

Particularly preferred high Mw isocyanate reactive compounds are polyols having a functionality from about 2.0 to about 3.0 and the preferred molecular weight range is from about 2,000 to about 16,000.

One group of suitable polyols include the propyleneoxide-polyethyleneoxide diols and triols obtained by the reaction of ethylene and propylene oxides, together or sequentially using as initiator water, ammonia, ethylene glycol, propylene glycol, ethanolamine and the like.

Preferred polyols are ethylene oxide capped polyols.

Particularly suitable low Mw isocyanate reactive compounds are chain extenders already known in the art. They comprise aliphatic or aromatic diamines such as toluenediamines. Preferred is a 80:20 weight ratio mixture of 3,5-diethyl-2,4-diaminotoluene and 3,5-diethyl-2,6-diaminotoluene. This mixture is universally referred to as DETDA.

Other suitable low Mw isocyanate-reactive compounds are ethylene glycol and 1,4 butanediol.

The isocyanate-reactive mixture B is produced by combining the ingredients by simple mixing at a temperature between −20° C. to 80° C. until a homogenous blend or a stable dispersion is obtained. The isocyanate-reactive blends should preferably be prepared in an inert, anhydrous atmosphere.

The reaction system of the present invention may further contain other conventional ingredients of such systems such as internal mould release agents, catalysts, surfactants, blowing agents, fillers (which may be reinforcements), plasticizers, fire retardants, coupling agents, and the like.

Suitable internal mould release agents include, for example, copper stearate, zinc stearate and a dimethyl polysiloxane with organic acid groups which is commercially available as Dow-Corning Q2-7119 from Dow-Corning Corporation. Other organo-polysiloxanes bearing organic hydroxyl groups (instead of acids) can also be used. A specific example of a very effective, hydroxy functional, polysiloxane internal mould release additive is L-412T (available form Goldschmidt AG).

The amount of internal mould release agent used can be from about 0.001 to about 5.0 percent by weight of the total reactants (i.e. total polymer).

Suitable catalysts include for example, tertiary amines or organotin compounds, organometallic derivatives, phosphines, tertiary organic amines, etc. For a review of catalysts conventional in the art, see for example Saunders et al., Polyurethanes, Chemistry and Technology, Part I, Interscience, New York, 1963; pages 228–232; see also, Britain et al., J. Applied Polymer Science, 4, 207–211, 1960.

Suitable surfactants include, for example, sodium salts of castor oil sulfonates; alkali metal or ammonium salts of sulfonic acids such as dodecyl benzene sulfonic acid; and polyether siloxanes having a structure such that a copolymer of ethylene oxide and propylene oxide is attached to a polydimethyl siloxane radical. The amount of surfactant used is less than about 2 percent by weight of the total reactants, preferably less than 1%.

Where foam-forming conditions are desired, suitable blowing agents include gases which are dissolved or dispersed in the reaction system.

Thus, the reaction mixture may contain dissolved or dispersed gases which may be injected therein or may be generated in situ by a chemical reaction or by the vaporisation of volatile liquids. Preferred reaction mixtures contain inert liquids having boiling points not exceeding 100° C., preferably not exceeding 50° C., at atmospheric pressure. As examples of such liquids, there may be mentioned hydrocarbons, chlorinated hydrocarbons, fluorinated hydrocarbons and chlorofluorocarbons. A foam-forming gas may also be generated by including water in the reaction mixture, the water reacting with the polyisocyanate to produce carbon dioxide and/or with the imine or enamine to form volatile carbonyl compounds. When using imino-functional or enamine-containing ingredients which react rapidly with water under the conditions of storage or processing, any water employed may advantageously be introduced as a separate stream at the time of reaction.

Suitable blowing agents also include, for example, dissolved or dispersed gases such as air, $CO_2$, or nitrogen.

Suitable fillers include fiberglass reinforcement fibers, particularly those having lengths of from about 1/16 inch (0.16 cm) to about ½ inch (1.27 cm) and milled glass fibers having a length of 1/16 inch (0.16 cm), ⅛ inch (0.32 cm) or ¼ inch (0.64 cm) and the like. Shorter fibers are always preferred for ease of processing when they are incorporated as part of the "A" or "B" component streams.

Other particularly suitable fillers are mica, fumed silica, flake glass, Wollastonite, calcium carbonate, carbon black, and the like.

By suitable choice of ingredients, concentrations and processing conditions of the products of the present invention—involving moulding, spraying or free-rise methods—polyurethane, polyurea-polyurethane or polyurea articles can be obtained, which may have open or closed cells.

In particular, integral skin foams, flexible foams or micro-cellular elastomers or RIM elastomers can be obtained.

The reaction injection moulding (RIM) process is performed in a RIM machine. RIM machines are well known in the art and include those supplied by Admiral Equipment Corp., Akron, Ohio, by Cincinatti Milacron Corp., Cincinnati, Ohio, by Battenfeld GmbH, Meinerzhagen, West Germany and by Kraus Maffei GmbH, West Germany.

The isocyanate and isocyanate-reactive components referred to as "A" Component and "B" Component are placed in separate containers, which are generally equipped with agitators, of the RIM machine wherein the temperature of the "A" Component is 20° C. to about 125° C. and the temperature of the "B" Component can be between about 20° to 80° C.

The "A" Component and "B" Component are impingement mixed in a forced mix head such as, for example, a Krauss-Maffei mix head. The "A" and "B" Components are pumped to the mix head by a metering pump, for example, a Viking Mark 21A, at a discharge pressure from about 700 to about 5000 psi.

It is preferred that a weight ratio be employed which yields a ratio of isocyanate equivalents in stream (A) to isocyanate-reactive functional groups in stream (B) between 0.70 and 1.90. This ratio of equivalents is known as the index.

The impingement mixed blend of "A"/"B" streams in injected into a mould at a velocity from about 0.3 lb./sec to about 70 lb./sec. The mould is heated to a temperature from about 20° C. to 250° C. Suitable moulds are made of metal such as aluminium or steel, although other materials can be used if they can withstand the processing conditions and wear.

A moulded polymer article is formed after the impingement mixture is in the mould from about 1 second to about 30 seconds, preferably 5 to 20 seconds. The mould is then opened and the moulded product is removed from the mould. The moulded product may be post cured by placing the product in an oven having a temperature between 50° C. and about 250° C. for a time from about one-half hour to about 3 hours.

The invention is illustrated but not limited by the following examples:

EXAMPLE 1

Prepolymer composition 1 was prepared by charging the reactor with 51.19 parts by weight of pure 4-4' methylenebis(phenylisocyanate) <MDI> and 37.22 parts by weight of a MDI mixture containing 21% by weight of 2-4' MDI. This isocyanate mixture, having thus a 2-4' MDI content of 10%, was heated up to 80° C. while stirring under $N_2$ atmosphere.

Subsequently, 11.58 parts by weight of a blend of dipropylene glycol <DPG> and polypropyleneglycol of Mw 4000<PPG 4000>
(in a weight ratio DPG/PPG 4000=11:1) was slowly added to the stirred mixture of polyisocyanate while keeping the reaction temperature between 80° C. and 85° C. (total addition time: 45 minutes).

After addition, the reaction mixture was further maintained under constant heating for another 75 minutes and subsequently cooled down to 40° C.

The prepolymer thus obtained had an NCO content of 23%.

EXAMPLE 2

Prepolymer composition 2 was prepared according to the procedure described in example 1 by charging the reactor with 88.22 parts by weight of a MDI mixture containing about 10% by weight of 2,4' MDI.

This isocyanate mixture was then reacted with 11.78 parts by weight of a blend of DPG and a glycerol based ethylene oxide/propylene oxide polyether polyol of OH number 32 (in a weight ratio of 8:1).

The prepolymer composition so obtained had an NCO content of 22.7% and a viscosity of 1125 cps (25° C.).

EXAMPLE 3

Prepolymer composition 3 was prepared using the procedure described in example 1, by charging the reactor with 88.35 parts by weight of a MDI mixture containing about 10% by weight of 2,4' MDI.

This isocyanate mixture was then reacted with 11.85 parts by weight of a blend of DPG and a glycerol based propylene oxide polyether polyol of OH number=32 (in a weight ratio of 8:1).

The prepolymer composition so obtained had an NCO content of 22.6% and a viscosity of 1140 cps (at 25° C.).

EXAMPLE 4

Prepolymer composition 4 was prepared using the procedure described in example 1, by charging the reactor with 88.19 parts by weight of a MDI mixture containing about 10% by weight of 2-4' MDI.

This isocyanate mixture was then reacted with 11.81 parts by weight of a blend of DPG and a glycerol based polyoxyethylene capped polyoxypropylene polyol having a OH number of 32 (in a weight ratio of 8:1).

The prepolymer composition so obtained had an NCO content of 22.9% and an viscosity of 1140 cps (at 25° C.).

EXAMPLE 5

Prepolymer composition 5 was prepared using the procedure described in example 1 by charging the reactor with 88.41 parts by weight of a MDI mixture containing about 10% by weight of a 2,4' MDI. The isocyanate mixture was then reacted with 11.59 parts by weight of a blend of DPG and a glycerol based polyoxyethylene capped polyoxypropylene polyol of OH number 32 (in a weight ratio of 11:1).

The prepolymer composition so obtained had an NCO content of 22.9%.

EXAMPLE 6

Prepolymer composition 6 was prepared using the procedure described in example 1 by charging the reactor with 84.62 parts by weight of a MDI mixture containing about 10% by weight of 2,4' MDI, to which was added 3.75 parts by weight of uretonimine-modified 4,4' MDI. This isocyanate mixture was then reacted with 11.63 parts by weight of a blend of DPG and a polyoxypropylene triamine of Mw 5000 - available from Texaco Chemical Corporation as JEFFAMINE T-5000 (in a weight ratio of 8:1).

The prepolymer composition thus obtained had an NCO content of 22.4%.

EXAMPLE 7

Prepolymer composition 7 was prepared using the procedure described in example 1 by charging the reactor with 84.9 parts by weight of a MDI mixture containing about 10% by weight of 2,4' MDI, to which was added 3.75 parts by weight of uretonimine-modified 4,4' MDI.

This isocyanate mixture was then reacted with 11.35 parts by weight of a blend of DPG and a polyoxyethylene capped polyoxypropylene triol of OH number 32 (in a weight ratio of 8:1).

The prepolymer composition so obtained had an NCO content of 22.9% and a viscosity of 950 cps (at 25° C.).

EXAMPLE 8

Prepolymer composition 8 was prepared using the procedure described in example 1 by charging the reactor with 84.9 parts by weight of a MDI mixture containing about 10% by weight of 2,4' MDI, to which was added 3.75 parts by weight of uretonimine modified 4,4' MDI.

This isocyanate mixture was then reacted with 11.35 parts by weight of a blend of DPG and a glycerol based polypropylene oxide polyether polyol of OH number 32 (in a weight ratio of 8:1).

The prepolymer composition so obtained had an NCO content of 23.4% and a viscosity of 850 cps (at 25° C.).

EXAMPLE 9

Prepolymer composition 9 was obtained by adding 25 parts by weight of a polyphenylene polymethylene polyisocyanate (polymeric MDI) having a NCO functionality of about 2.7 and 3 parts by weight of uretonimine modified 4,4' MDI to 72 parts by weight of the prepolymer composition 1, while stirring for 15 minutes at 40° C. The prepolymer composition so obtained had a NCO content of 25.11%.

EXAMPLE 10

A polyurethane integral skin foam was prepared by reacting 56.2 parts of prepolymer composition 9 with 100 parts of a glycerol based polyoxyethylene capped polyoxypropylene polyol of OH number 32, plus 8 parts of monoethylene glycol, 1 part of DABCO-catalyst (a 33% solution of triethylene diamine in dipropylene glycol, marketed by Air Products Inc.), 15 parts of trichlorofluoromethane and 0.1 parts H$_2$O. The reaction mixture was prepared at an isocyanate index of 100.

The isocyanate and polyol components were mixed at 20° C. for 10 seconds and the mixture subsequently poured into a mould (dimensions of the mould were: 20×15×4 cm) at 40° C., after which the mould was closed. After opening the mould, the blocks were inspected for green strength and submitted to physical testing.

The physical characteristics of the integral skin foams blocks thus obtained are as follows (see table 1):

TABLE 1

| Parameter | Unit | Method | |
|---|---|---|---|
| Demould time | s | | 135 |
| Specific gravity | Kg/m$^3$ | ISO 845 | 250 |
| Hardness | Shore A | ISO 868 | 70 |
| Tear strength | N.m$^{-1}$ | DIN 53507 | 4077 |
| Compression set of 50% | % | ISO 1856 | 6.6 |
| Tensile strength | kPa | DIN 53504 | 2000 |
| Elongation at break | % | DIN 53504 | 135 |

EXAMPLE 11-17

Further polyurethane integral skin foams were prepared using the procedure described in example 10, except that as isocyanate compositions, use was made of the prepolymer compositions stated in table 2a below.

TABLE 2a

| | Isocyanate compositions | | | | | | |
|---|---|---|---|---|---|---|---|
| Example | 11 | 12 | 13 | 14 | 15 | 16 | 17 |
| Ingredients (parts by weight) | | | | | | | |
| prepolymer composition 2 | 77 | — | — | — | — | — | — |
| prepolymer composition 3 | — | 77 | — | — | — | — | — |
| prepolymer composition 4 | — | — | 77 | — | — | — | — |
| prepolymer composition 5 | — | — | — | 81 | — | — | — |
| prepolymer composition 6 | — | — | — | — | 80 | — | — |
| prepolymer composition 7 | — | — | — | — | — | 52.5 | — |
| prepolymer composition 8 | — | — | — | — | — | — | 52.5 |
| uretonimine modified | 3 | 3 | 3 | 3 | — | — | — |

TABLE 2a-continued

| | Isocyanate compositions | | | | | | |
|---|---|---|---|---|---|---|---|
| Example | 11 | 12 | 13 | 14 | 15 | 16 | 17 |
| 4,4'MDI | | | | | | | |
| polymeric MDI | 20 | 20 | 20 | 16 | 20 | 47.5 | 47.5 |
| NCO content % | 24.5 | 24.4 | 24.7 | 24.5 | 24.1 | 26.5 | 26.7 |

The physical characteristics of the thus obtained integral skin foams are as follows (see table 2b).

TABLE 2b

| Example | Demould time s | Specific gravity kg/m³ (ISO 845) | Hardness Shore A (ISO 868) | Indentation hardness N (ISO 3386) | Tear strength N/m (DIM 53507) | Compression set set at 50% compression (ISO 1856) | Tensile strength kPa (DIN 53504) | Elongation at break % (DIN 53504) |
|---|---|---|---|---|---|---|---|---|
| 11 | 135 | 245 | 57 | 109 | 3 800 | 8.7 | 3 000 | 150 |
| 12 | 135 | 240 | 57 | 106 | 4 370 | 8.8 | 2 900 | 150 |
| 13 | 135 | 241 | 57 | 101 | 3 970 | 8.5 | 3 000 | 155 |
| 14 | 135 | 230 | 53 | 74.5 | 3 460 | 8.9 | 2 150 | 160 |
| 15 | 135 | 251 | 53 | 96 | 3 310 | 10.2 | 2 300 | 147 |
| 16 | 120 | 246 | 55 | 86 | 2 100 | 9.5 | 2 000 | 105 |
| 17 | 120 | 248 | 52 | 86 | 1 970 | 11.3 | 1 950 | 110 |

EXAMPLE 18

An elastomer product was prepared on a Battenfeld SHK-65 machine, using the RIM technique.

As "A component" use was made of 100 parts by weight of Prepolymer composition 7.

As "B component" use was made of the following polyol blend:

69.6 parts by weight of an ethylene oxide capped polypropylene glycol of Mw about 3750.
8.6 parts by weight of a polyoxyethylene capped polyoxypropylene triol of OH number 32
21.1 parts by weight of DETDA
0.59 parts by weight of DABCO (a 33% solution of triethylene diamine in dipropylene glycol)
0.14 parts by weight of DBTDL (dibutyltin dilaurate)

The weight ratio of component A to component B was such as to obtain an isocyanate index of 105.

The temperature of the components was about 40° C. The temperature of the mould was maintained at approximately 95° C.

The properties of the elastomer product thus obtained are indicated in the following table 3.

TABLE 3

| Properties of the elastomer product obtained | | | |
|---|---|---|---|
| Parameter | Unit | Method | |
| Specific gravity | Kg/m³ | ISO 845 | 1134 |
| Flexural Modulus | MPa | ASTM D 750 | 345 |
| Hardness | Shore D | ISO 868 | 58 |
| Tensile strength | KPa | ISO 527 | 34400 |
| Elongation at break | % | ISO 527 | 340 |
| Impact | | | |
| +20° C. | J | BS 2782/ 306 B | 149 |
| −20° C. | | | No break 82 |

EXAMPLE 19

A flexible polyurethane foam was prepared as follows. As isocyanate component, use was made of a blend comprising 80% by weight of prepolymer composition 7 and 20% by weight of polymeric MDI.

53 parts by weight of this blend were further combined with 100 parts by weight of a polyol blend consisting of:

100 parts by weight of a glycerol based ethylene oxide tipped polyoxypropylene polyol, having an OH number of 28
6 parts by weight of Arcol 2580 (a polyol available from ARCO Chem. Co.) having a OH number of 42
0.6 parts by weight of a silicone based suffactant (B 4113 from Goldschmidt)
2.5 parts of H₂O
1.1 part by weight of a catalyst XE 8512 (available from Air Products)

The isocyanate component and the polyol blend were mixed at ambient temperature, for 6 sec. at 5000 rpm to form a flexible foam.

The cream time was 9 sec., the string time was 74 sec. and the end of rise time was 101 sec. The physical properties of the foamed end product are indicated in Table 4 below.

TABLE 4

| Parameter | Unit | Method | |
|---|---|---|---|
| Core density | Kg/m³ | ISO 845 | 53.4 |
| Elongation | % | DIN 53571 | 155.0 |
| Tensile strength | KPa | DIN 53571 | 105.2 |
| Tear strength | N/m | DIN 53507 | 256 |
| Resiliences | % | ASTM D3774 | 52 |
| Compression | % | DIN 53572 | |
| set/40° C.-Dry | | | |
| at 50% compr. | | | 12.2 |
| at 75% compr. | | | 10.1 |

EXAMPLES 20-21

Polyurethane microcellular shoe-sole elastomers were prepared using the following isocyanate components Example 20: a prepolymer composition according to example 8 except that the content of 2,4' MDI was 20% by weight Example 21: a prepolymer composition according to example 8 except that the content of 2,4' MDI was 2.5% by weight.

As polyol component, use was made of a blend consisting of:

84.32 parts by weight of an ethylene oxide tipped polyoxypropylene polyol based on glycerol/diethylene glycol, having OH number 38
10 parts by weight of 1,4 butane diol
0.40 parts by weight of solid DABCO catalyst
0.017 parts by weight of a tin catalyst available form Witco Corp. (FORMREZ UL 1)
0.10 parts by weight of a silicone surfactant available from Dow Corn. (DC 193)
0.18 parts by weight of H₂O 6.33 parts by weight of trichlorofluoromethane The weight ratio of the isocyanate composition to the polyol blend was such that an isocyanate index of about 100 was obtained.

The isocyanate and polyol components were hand-mixed at 25° C. for 10 seconds and the mixture subsequently poured into a mould (dimensions of the mould were: 20×20×1 cm) at 40° C., after which the mould was closed.

After opening the mould, the sample was inspected for green strength and submitted to physical testing.

The physical properties of the sample are indicated in Table 5 below.

TABLE 5

Physical properties of the microcellular shoe-sole obtained

| Parameter | Unit | Method | Example 20 | Example 21 |
|---|---|---|---|---|
| Specific gravity | Kg/m$^3$ | ISO 845 | 500 | 500 |
| Hardness | Shore A | ISO 868 | 57 | 65 |
| Tensile strength | MPa | DIN 53504 | 36 | 47.4 |
| Elongation at break | % | DIN 53504 | 360 | 300 |
| Flex life (% cut/ 50000 cycles) | % | DIN 53522 | 300 | 50 |

We claim:

1. A polyisocyanate prepolymer composition comprising the reaction product of:
   (a) an organic polyisocyanate or polyisocyanates mixture optionally comprising carbodiimide or uretonimine modified isocyanate groups, and having an isocyanate functionality of 2.0–4.0,
   (b) a high molecular weight isocyanate reactive compound or mixture thereof having a molecular weight from above 1,000 to 10,000 and a number average functionality of 1.8–5, and
   (c) a low molecular weight isocyanate reactive compound or mixture thereof, having a molecular weight from about 60 to below 1,000 and an average isocyanate-reactive functionality of 1.8 to 5.0. wherein the weight ratio of low to high Mw compounds is above 6.

2. A polyisocyanate composition according to claim 1, wherein the weight ratio of low to high Mw compounds is between 6 and 1,000.

3. A polyisocyanate composition according to claim 1, wherein the weight ratio of low to high Mw compounds is in the range 7 to 20.

4. A polyisocyanate composition according to claim 1 wherein the organic isocyanate is a polyphenyl polymethylene polyisocyanate.

5. A polyisocyanate composition according to claim 1 wherein the organic polyisocyanate or isocyanate mixture comprises at least 50% by weight of diisocyanate.

6. A polyisocyanate composition according to claim 1 wherein the high Mw compound has a number average Mw of 1,000–7,000.

7. A polyisocyanate composition according to claim 1 wherein the high Mw compound is an amino-, imino-, enamino- and/or hydroxyl-functional polyether, polycarbonate, polyolefin, polysiloxane, polyester or mixtures thereof.

8. A polyisocyanate composition according to claim 1 wherein the low Mw compound or mixture thereof is a non-polymeric glycol, an aromatic diamine, an aliphatic diamine, a cycloaliphatic diamine, an alkanolamine or mixtures thereof.

9. A polyisocyanate composition according to claim 8, wherein the non-polymeric glycol is dipropylene glycol.

10. A polyisocyanate composition according to claim 1 wherein the final free NCO content is in the range 5%–30% by wt.

11. A polyisocyanate composition according to claim 1 having a viscosity of less than 8,000 cps (at 25° C.).

* * * * *